(12) United States Patent
Maier et al.

(10) Patent No.: US 11,175,130 B2
(45) Date of Patent: Nov. 16, 2021

(54) DEVICE FOR USE IN A NUMERICALLY CONTROLLED MACHINE TOOL FOR APPLICATION IN A METHOD FOR MEASURING THE NUMERICALLY CONTROLLED MACHINE TOOL

(71) Applicant: DECKEL MAHO PFRONTEN GMBH, Pfronten (DE)

(72) Inventors: Marzell Maier, Isny (DE); Stefan Marczinek, Lechbruck (DE); Thomas Lochbihler, Vils (AT)

(73) Assignee: DECKEL MAHO PFRONTEN GMBH, Pfronten (DE)

( * ) Notice: Subject to any disclaimer, the term of this patent is extended or adjusted under 35 U.S.C. 154(b) by 226 days.

(21) Appl. No.: 16/473,093

(22) PCT Filed: Dec. 20, 2017

(86) PCT No.: PCT/EP2017/083727
§ 371 (c)(1),
(2) Date: Jun. 24, 2019

(87) PCT Pub. No.: WO2018/115071
PCT Pub. Date: Jun. 28, 2018

(65) Prior Publication Data
US 2019/0339072 A1 Nov. 7, 2019

(30) Foreign Application Priority Data
Dec. 22, 2016 (DE) .................... 10 2016 226 073.1

(51) Int. Cl.
*G01B 21/04* (2006.01)
*B23Q 1/52* (2006.01)
(Continued)

(52) U.S. Cl.
CPC ............. *G01B 21/042* (2013.01); *B23Q 1/52* (2013.01); *B23Q 17/22* (2013.01); *G01B 1/00* (2013.01);
(Continued)

(58) Field of Classification Search
CPC ........ G01B 21/04; G01B 3/22; G01B 21/045; G01B 21/042; G01B 1/00; G01D 5/34715;
(Continued)

(56) References Cited

U.S. PATENT DOCUMENTS 5,111,590 A   5/1992  Park
5,430,948 A   7/1995  Vander Wal, III
(Continued)

FOREIGN PATENT DOCUMENTS

CN   102216736   * 10/2011   ............. G01D 5/266
CN   202599288 U   12/2012
(Continued)

OTHER PUBLICATIONS

Nov. 4, 2020 Office Action issued in Japanese Patent Application No. 2019-534103.
(Continued)

*Primary Examiner* — Tung S Lau
(74) *Attorney, Agent, or Firm* — Oliff PLC

(57) ABSTRACT

A device for use on a numerically controlled machine tool for application in a method for measuring the numerically controlled machine tool, including: a first measuring element for measuring via a measuring apparatus, a second measuring element for measuring via the measuring apparatus, a spacer element on which the first measuring element and the second measuring element are arranged spaced from each other, and at least one fastening portion for fastening the device to a machine part of the machine tool.

24 Claims, 8 Drawing Sheets

(51) Int. Cl.
*B23Q 17/22* (2006.01)
*G01B 1/00* (2006.01)
*G05B 19/4063* (2006.01)

(52) U.S. Cl.
CPC ...... *B23Q 2717/00* (2013.01); *G05B 19/4063* (2013.01); *G05B 2219/33329* (2013.01)

(58) Field of Classification Search
CPC ...... G01D 5/266; G01D 5/34707; B23Q 1/52; B23Q 17/22; B23Q 2717/00; G05B 19/4063; G05B 2219/33329
See application file for complete search history.

(56) References Cited

U.S. PATENT DOCUMENTS

| | | | |
|---|---|---|---|
| 5,983,512 | A | 11/1999 | Trapet |
| 6,525,311 | B1 * | 2/2003 | Burgschat .......... G01D 5/34715 250/237 G |
| 10,150,192 | B1 * | 12/2018 | Navarro, Sr. ............ G01B 3/22 |
| 2002/0148133 | A1 | 10/2002 | Bridges et al. |

FOREIGN PATENT DOCUMENTS

| | | | | |
|---|---|---|---|---|
| CN | 105598744 A | | 5/2016 | |
| CN | 103477181 B | * | 3/2017 | ............. G01B 5/008 |
| CN | 107548449 A | * | 1/2018 | ............. G01B 21/00 |
| CN | 107850426 | * | 3/2018 | ........... G01B 21/045 |
| DE | 39 30 223 A1 | | 3/1991 | |
| DE | 195 07 805 A1 | | 9/1996 | |
| DE | 196 11 617 A1 | | 9/1997 | |
| DE | 197 20 883 A1 | | 11/1998 | |
| DE | 199 60 191 A1 | | 6/2001 | |
| DE | 101 59 442 A1 | | 7/2002 | |
| DE | 10 2010 038 783 A1 | | 2/2011 | |
| EP | 1 696 289 A1 | | 8/2006 | |
| EP | 2 050 534 A1 | | 4/2009 | |
| JP | 2004-502955 A | | 1/2004 | |
| JP | 2009-133790 A | | 6/2009 | |
| JP | 2016-097459 A | | 5/2016 | |
| JP | 6179870 B1 | * | 2/2017 | ......... G05B 19/4063 |
| WO | WO 9608693 | * | 3/1996 | ......... G01D 5/34707 |

OTHER PUBLICATIONS

Dec. 2, 2020 Office Action issued in Chinese Patent Application No. 201780080363.2.
May 3, 2018 International Search Report issued in International Patent Application No. PCT/EP2017/083727.
Sep. 12, 2017 Office Action issued in German Patent Application No. 10 2016 226 073.1.
Jun. 22, 2021 Office Action issued in Chinese Patent Application No. 201780080363.2.
Jul. 7, 2021 Office Action issued in Japanese Patent Application No. 2019-534103.

\* cited by examiner

DEVICE FOR USE IN A NUMERICALLY CONTROLLED MACHINE TOOL FOR APPLICATION IN A METHOD FOR MEASURING THE NUMERICALLY CONTROLLED MACHINE TOOL

The present invention relates to a device for use in a numerically controlled machine tool for application in a method for measuring the numerically controlled machine tool. Furthermore, the present invention relates to the method itself as well as to a system comprising a numerically controlled machine tool and the device according to the invention.

BACKGROUND OF THE INVENTION

Methods for measuring machine tools, as are known, for example, from EP 1 696 289 A1 or DE 10 2010 038 783 A1 are used, inter alia, to check the machine tool for accuracy deviations. These deviations can arise, for example, from wear of guides or by collisions of movable machine parts with each other.

EP 1 696 289 A1 describes a method for measuring a rotary axis on a machine tool. Here, a measuring ball is probed in two measuring positions (two-point measurement) resulting from further pivoting a rotary axis on which the measuring ball is mounted. Since the radius of the measuring ball is known, the spatial position of the respective ball center point of the measuring ball (or another measuring ball reference point) at the respective measuring position, e.g. with respect to the machine coordinate system, can be determined by probing at three points of the measuring ball surface (in each of the two measuring positions of the measuring ball) and determining the coordinates of the three surface points. From the pivoting angle of the rotary axis between the two measuring positions and the respectively determined spatial positions, a center point position of the rotary axis is determined.

From the coordinates of the two measurements, the pivot point of the rotary axis is determined on which the measuring ball has been mounted. In order to calculate a linear axis, the two-point measurement described above can be repeated at a different height above the rotary axis, whereby a pivot point for this height can be calculated from the two-point measurement. The connection of both pivot points is used to determine the direction of the rotary axis.

DE 10 2010 038 783 A1 describes a method in which the movement of a rotary axis is determined by probing a plurality of positions of a gauge on the circumference of the rotary axis by moving the linear machine axes. The measured values thus determined are used to computationally determine a circular path which runs through the coordinates of the probed points. It is also described that the measurement results may be used to determine a relative tilt error between the rotary axis and the probing linear axes.

Furthermore, a method (and a corresponding device) for checking the machine accuracy by the measuring system manufacturer RENISHAW is known, in which the measurements (circularity test) may be carried out by means of a "ballbar" over both full circles and partial circles. Measurements are taken from all 3 planes of a machine in one clamping. Based on 3 associated measurements, the volumetric accuracy of a machine may then be determined.

However, the methods described above have some disadvantages in that the measurement setups used must be partially moved in order to measure certain axes. However, moving the measurement setup increases the duration of the measurement of the axes and also entails the risk of introducing additional uncertainties into the measurement. Another disadvantage of RENISHAW's system is that much of the circularity testing can only be carried out over relatively limited partial circles, so that machine inaccuracies in the non-traversed areas may be "missed". Further, in the method of RENISHAW, a support member is mounted on the center of rotation of the machine table in order to analyze the circular motion between the work spindle and the machine table. Therefore, a significant positioning error of the support element may superimpose the deviations of the circular movement, since an exact positioning on the center of rotation of the table is virtually impossible and a positioning very close to the center of rotation allows only a few measurements, on the basis of which a conclusion about the location of the "real" center of rotation of the machine table would have to be drawn.

SUMMARY OF THE INVENTION

It is therefore an object of the present invention to provide a device for use on a numerically controlled machine tool for application in a method for measuring the numerically controlled machine tool, with which the above problems can be avoided and based on which an optimization of the machine tool geometry may be performed.

Furthermore, it is an object of the present invention to provide a method which can be carried out with the device according to the invention, as well as a system comprising the device according to the invention and a machine tool.

These objects are achieved by a device according to claim 1, a system according to claim 23, and a method according to claim 24. The dependent claims relate to advantageous embodiments of the device according to the invention.

The device according to the invention for use on a numerically controlled machine tool for application in a method for measuring the numerically controlled machine tool comprises: a first measuring element for measuring via a measuring apparatus, a second measuring element for measurement via the measuring apparatus, a spacer element on which the first measuring element and the second measuring element are arranged spaced apart from each other, and at least one fastening portion for fastening the device to a machine part of the machine tool.

By means of the device according to the invention with a corresponding arrangement of the measuring elements, a plurality of axes of the machine tool can be measured in a measuring cycle and their corresponding errors (such as in the straightness of the linear axes, crossing angle, compensation error for linear axes, pitch errors for rotary axes, tumbling of the rotary axes, etc.) can be determined. For example, for a 5-axis machine tool, it is possible to measure the 3 linear axes and the 2 rotary axes in one cycle. However, a variety of other types of machine tools (e.g., lathes, grinding machines, eroding machines, etc.) may also be advantageously measured with the device of the present invention. The results obtained may in turn be used to decide whether the corresponding machine tool must undergo a more elaborate revision (for example, by reworking or replacing guides, bearings, etc.), or whether a significantly more time and cost-saving possibility of compensation, i.e., the adjustment of the machine parameters (correction of target values/target positions) exists instead.

This makes it possible to calibrate the basic geometry (accuracy) of the machine in addition to the machine kinematics.

The use of two measuring elements which are spaced apart from each other by a spacer element and are, e.g., probed by a measuring probe to measure the position of the measuring elements (ball distance measurement), results in the method for measuring the machine tool being significantly simplified, among other things. The user only has to position the device on the machine part once and can measure all the axes by means of the positioned device according to the configuration of the machine tool.

The use of the measuring probe for detecting the position of the measuring elements is only one example of point measuring systems and will be further used as an example below. However, any other point measuring systems may be used, e.g. a laser spot meter or an air gap meter.

In addition, by means of the device it is possible to omit a fine subdivision of the different positions of the machine parts with the attached device, because more measuring points per position can be detected by the two measuring elements. Thus, the axes of the machine tool can be measured in coarser steps, thereby speeding up the method as a whole.

It is an advantage of the described device that the distance between the measuring elements is not only known, but that it can also be kept as constant as possible over several measuring cycles. Since, for example, during continued operation of the machine, the temperature distribution and values within the machine change, these changes could be reflected in the condition of the spacer element and thus in the measurement. Because of this, a spacing element was selected which is largely insensitive to expected changes in the ambient conditions.

Thus, this distance may be used as a kind of "length standard" and thus as a reference value for measuring the machine, even over a longer measurement cycle with varying ambient conditions.

Another crucial characteristic of the above-described device for avoiding errors in the measurement of the measuring elements due to a faulty measuring arrangement is that the measuring elements along with the spacer element can be fastened to the machine part while creating very little tension.

This is achieved by having clamping and/or magnetic fastening and/or locking options. These options make it possible to position the measuring elements along with the spacer element on the machine part as desired, and only then to fix the location of the spacer element with the measuring elements relative to the machine part. It is to be noted that the device may not only be fastened on a machine part, but moreover also on a corresponding workpiece, which, e.g., is to be processed following the measuring of the machine tool with workpiece, or may be fastened in combination on a machine part and a workpiece.

Therefore, a very swift classification of machine tools of a machine park existing in a factory is possible in order to correspondingly manufacture precise parts in the machine tools having the necessary accuracies. Furthermore, by knowing the corresponding inaccuracies of a machine tool, it may be predicted which accuracy the part to be manufactured will have.

With the application of the device according to the invention and the subsequent calibration of the machine tool based thereon, the inventors were able to achieve a significant increase in the machine accuracy while keeping the device for measuring the machine tool very simple and uncomplicated.

A particularly advantageous further development of the device according to the invention is that the first and second measuring elements are each fastened to the spacer element via a rigid connection.

At this point and in the following, the rigid connection should be understood to ensure that the relative position of the measuring elements to the spacer element is fixed. The rigid connection may thus also be considered to be a secured and fixed connection between measuring elements and spacer element, such that the measuring elements and the spacer element may only be separated from each other or the relative position of these elements may only be changed by releasing the attachment/fixation. This is for of great advantage for retracing the measurement results, in particular with multiple measurements. By releasing the connection, the previously defined distance and the previously determined position between the measuring elements is lost, so that after renewed attachment of the measuring elements on or at the spacer element, the device according to the invention would have to be measured again.

The rigid connection ensures that the two measuring elements and the spacer element form a unit. Only then forming this unit as a kind of "length standard" is possible. This is important for the measurement of the machine tool with regard to the accuracy of the measurement results and for a possible use as a reference value during the measurement.

Furthermore, the device according to the invention may advantageously be further developed in that the spacer element has a portion arranged between the first and second measuring elements, the portion being formed from a material which has a coefficient of thermal expansion of less than or equal to $3.0 \times 10^{-6}$ $K^{-1}$, in particular less than or equal to $1.0 \times 10^{-6}$ $K^{-1}$; or the spacer element has a portion arranged between the first and second measuring elements, which is formed from a material which has a coefficient of thermal expansion of less than or equal to $3.0 \times 10^{-6}$ $K^{-1}$ in the spacing direction between the first and second measuring elements, in particular less than or equal to $1.0 \times 10^{-6}$ $K^{-1}$.

Moreover, the device according to the invention may advantageously be further developed in that the spacer element includes a material which, at least between the first and second measuring elements, has a thermal expansion coefficient of less than or equal to $3.0 \times 10^{-6}$ $K^{-1}$, in particular less than or equal to $1.0 \times 10^{-6}$ $K^{-1}$; or the spacer element has a material which, at least between the first and second measuring elements in the spacing direction between the first and second measuring elements, has a coefficient of thermal expansion of less than or equal to $3.0 \times 10^{-6}$ $K^{-1}$, in particular less than or equal to $1.0 \times 10^{-6}$ $K^{-1}$.

In any case, it is advantageous if either the entire spacer element or a part of the spacer element which is arranged between the first and the second measuring element consists of a material which has a comparatively low coefficient of thermal expansion in order to be largely insensitive to changes in the ambient temperature.

An advantageous further development of the device according to the invention is that the spacer element has a portion arranged between the first and second measuring elements which is formed of a carbon fiber reinforced plastic, or the spacer element is formed of a carbon fiber reinforced plastic, or the spacer element is formed as a carbon fiber rod.

Carbon fiber reinforced plastic or a carbon fiber rod have already proved very advantageous in first experiments of the inventors, since this material and a rod-shaped spacer made thereof do not only have a very low coefficient of thermal expansion, but the resulting spacer element is also very resistant to bending and compressive/tensile stress, while still having a relatively low weight. This in turn is very advantageous, since the rod-shaped spacer element is significantly less deformed (outside of the vertical arrangement) by its own low weight and thus the predetermined distance between the two measuring elements is less affected by uncertainties, regardless of the position in which the rod-shaped spacer element is arranged in the machine tool.

The device according to the invention may also be further developed in that the spacer element has a portion arranged between the first and second measuring elements which is formed from quartz glass, or the spacer element is formed from a quartz glass, or the spacer element is configured as a quartz glass rod.

Another material advantageous for the formation of the spacer element due to a very low coefficient of thermal expansion is quartz glass. Like carbon, this material offers a very low susceptibility to temperature changes. Its higher density, however, should be considered when forming the spacer element therewith.

However, instead of the carbon fiber rod or quartz glass rod, metallic materials may also be used for the spacer, e.g. for reasons of saving cost and/or lower accuracy requirements. Metallic materials have significantly higher coefficients of thermal expansion compared to a carbon fiber material or quartz glass and therefore respond much more strongly to changes in ambient temperatures. Furthermore, spacer elements made of metallic material may have a significantly higher weight than, e.g., a carbon fiber rod, which may additionally affect the measurement accuracy in certain positions of the device.

A particularly advantageous further development of the device according to the invention which is possible is that the first and/or the second measuring element is a measuring ball or has at least one measuring ball portion.

In order to treat the measuring elements as a measuring point during the measurement, it has proved to be particularly advantageous to configure the measuring elements as a ball or with spherical portions. With this shape, it is possible to detect the center point of the ball/ball portion using a known radius of the ball/ball portion, regardless of which side the probe touches the measuring element from, and to use the detected center point as a measuring point.

It is particularly advantageous if the balls or the ball sections have the largest possible exposed area, which can be probed, for example, by the measuring probe. This has the advantage that the determination of the center point of each ball may be performed separately. In addition, a displacement of the balls relative to each other may be easily recognized, since the balls may be detected from almost all sides. Both advantages offer the possibility to further increase the measuring accuracy.

The device according to the invention may advantageously be further developed with a first fastening element having a first fastening portion for fastening the device to the machine part of the machine tool and a second fastening element with a second fastening portion for fastening to the machine part of the machine tool, wherein the first fastening element and the second fastening element are arranged spaced from each other on the spacer element.

Furthermore, the device according to the invention may advantageously be further developed by fastening the first and second fastening elements each via a rigid connection to the spacer element and/or to a respective one of the measuring elements.

This allows for a multi-point attachment of the unit consisting of measuring elements and spacer element to the machine part for a more stable arrangement of this unit. Here, a preferred example is a two-point attachment of the device. Nevertheless, fastenings with only one or more than two fastening elements are possible. Therefore, the two-point attachment will be understood below as an example selected from a variety of possibilities. Again, it is expressly pointed out that the device may not only be fastened on a machine part, but may also be fastened on a corresponding workpiece or in combination on a machine part and a workpiece.

The device according to the invention may be further developed advantageously by the first and second fastening elements each being fastened via a lockable connection to the spacer element and/or to a respective one of the measuring elements.

The lockable connection makes it possible to fix the fastening elements to the machine part, while the position of the spacer element and/or measuring element relative to the fastening elements is still variable. This is particularly important for a stress-free arrangement of the measuring elements with the spacer element, since only thereby it can mostly be ensured that the previously defined distance is maintained by the spacer element even after arrangement and fixation in the machine tool.

An advantageous development of the device according to the invention is that the first and/or second fastening element is pivotable and/or freely rotatable relative to the spacer element in the unlocked state of the lockable connection.

The device according to the invention may be developed advantageously by the lockable connection of the first and/or second fastening element having one or more joints, in particular rotary and/or ball joints.

In particular, the possibility that the connection between fastening elements and spacer element or measuring element has a plurality of rotational degrees of freedom allows a state of the space to be as tension-free as possible and thus the distance predefined by the spacer element (as an important part of the "length standard") to be affected as little as possible. In particular, rotary and/or ball joints are therefore a preferred choice for fastening the spacer elements with the measuring elements in a tension-free manner.

A particularly advantageous development of the device according to the invention consists of the first fastening element being connected to the spacer element and/or a respective one of the measuring elements via a first intermediate element, wherein a first joint is arranged between the first fastening element and the first intermediate element and a second joint is arranged between the first intermediate element and the spacer element and/or the respective one of the measuring elements, and/or the second fastening element is connected via a second intermediate element to the spacer element and/or a respective one of the measuring elements, wherein a third joint is arranged between the second fastening element and the second intermediate element and a fourth joint is arranged between the second intermediate element and the spacer element and/or the respective one of the measuring elements.

In order to further increase the flexibility of the attachment of the spacer element with the measuring elements and also to meet the requirement of a tension-free arrangement, intermediate elements may be used, which are arranged between the fastening elements and the measuring elements or the spacer element. Each of these intermediate elements has at least two joints, which are provided for the connection of the fastening element to the spacer element and/or measuring element. These joints may again have a plurality of rotational degrees of freedom, which makes it possible to first fix the fastening elements relative to the machine part and then fix the measuring elements with the spacer element relative to the fastening elements.

The device according to the invention may be further developed advantageously by the first intermediate element having a locking means for simultaneously locking the first and second joints, and/or the second intermediate element having a locking means for simultaneously locking the third and fourth joints.

Furthermore, a state of the spacer element with the measuring elements which is as tension-free as possible may be accomplished when the locking is achieved via the intermediate elements, wherein at least two joints are fixed/locked at the same time when locking an intermediate element. For this purpose, clamping locking options as already described above are again advantageous.

The device according to the invention may be further developed advantageously by the first and/or second fastening element including a magnetic holder for attachment to the machine part of the machine tool.

As a result, a very flexible use of the device on all surfaces that are magnetizable is possible. Thus, the device is not dependent on being fastened by means of existing screw-on points or similar, grid-dependent fastening options within the machine tool, but can be attached anywhere on the part of the machine needed for the measurement of the machine tool (or its components) by the magnetic holders.

The device according to the invention may be further developed advantageously by the magnet holder including a switchable electromagnet and/or a mechanically switchable magnetic base.

Both an electrically operated magnetic coil and a purely mechanically switching magnetic base (for example, by changing the position of the permanent magnet installed inside the magnetic base) may be used for fastening the device within the machine tool.

Furthermore, releasable adhesive bonds may also be used as well as clamping connections (such as threaded connections, clamps, etc.) to fasten the fastening elements to a machine part of the machine tool.

An advantageous development of the device according to the invention is that the spacer element defines a predetermined distance between the first and second measuring elements.

Advantageously, the spacer element also has a very low thermal expansion coefficient, so that the predetermined distance between the first and second measuring elements can be maintained even under varying ambient conditions (such as temperature changes).

The device according to the invention may be developed advantageously by the predetermined distance between the first and second measuring elements being greater than or equal to 100 mm, and in particular greater than or equal to 200 mm, in particular greater than or equal to 300 mm.

Furthermore, the device according to the invention may advantageously be further developed by the predetermined distance between the first and second measuring elements being less than or equal to 800 mm, and in particular less than or equal to 700 mm, in particular less than or equal to 600 mm.

These distances have been found to be advantageous in first application tests of the principle of the device according to the invention and allow for the use in a large number of machine tools of different table sizes and working space volumes.

An advantageous development of the device according to the invention is that the device is provided for use on a predetermined machine tool, wherein the machine tool has a controllable linear axis and the spacer element has a predetermined distance between the first and second measuring elements, which is 30% to 70%, in particular 40% to 60%, and in particular substantially 50% of the axial length of the controllable linear axis.

Depending on the table size and axis length of the controllable linear axes, it makes sense to select longer or shorter distances between the two measuring elements accordingly. Certain distances (e.g., about 50% of the axial length) have proved to be advantageous in relation to the axial length of the controllable linear axes, so that a size of the device adapted to the machine size may preferably be used for a quick evaluation of the accuracy of the machine tool (machine geometry).

However, smaller or larger distances between the two measuring elements may also be advantageous for the corresponding application. For example, distances that correspond to less than 50% of the axial length of the machine tool may be advantageous. Although a displacing the device for measuring the machine tool multiple times is more complex, it allows for significantly more measuring points to be detected on the basis of which a more detailed and thus more accurate evaluation of the machine accuracy is possible.

A system according to the invention comprises a numerically controlled machine tool and a device for use on the numerically controlled machine tool according to one of the aforementioned aspects/developments.

A method for measuring the numerically controlled machine tool according to the invention comprises the following steps: receiving a measuring apparatus on the work spindle of the machine tool, mounting a device according to one of the aforementioned developments on a linearly and/or rotationally displaceable machine part of the machine tool, determining a respective actual position of the first measuring element with the measuring probe in at least two positions of the machine part on the machine tool, determining a respective actual position of the second measuring element with the measuring apparatus in at least two positions of the machine part on the machine tool, determining one or more coordinate reference parameters of one or more controllable axes of the machine tool based on the determined actual positions of the first and second measuring elements in the at least two positions of the machine part of the machine tool, the respective target positions of the first and second measuring elements in the at least two positions of the machine part of the machine tool, and a known distance between the first and second measuring elements.

Here, a point measuring system may be used as the measuring apparatus, which may also comprise a laser spot meter or an air gap meter in addition to a measuring probe as a preferred measuring apparatus.

As is common with measurements using, e.g., a measuring probe and corresponding measuring elements, at least two positions of the measuring elements are successively acquired by the measuring probe and then compared with the positions that the measuring elements should have had ideally, wherein the distance of the measuring elements to each other is further taken into account in this method (e.g., as a reference value). The method disclosed herein is not limited to first acquiring a plurality of positions of the first measuring element in order to subsequently start the measurement by means of the second measuring element. Rather, only a first position of the first and second measuring elements may be acquired before the device is moved with the corresponding machine part, in order to subsequently continue the measurement at the second position of the first or second measuring element.

Furthermore, the method is also not limited to arranging the two measuring elements in a plane parallel to the surface of the machine part on which the device has been mounted. If the device includes the abovementioned intermediate elements, it is also possible to intentionally provide height offsets between the measuring elements in order to measure all five axes of a 5-axis machine tool in one measuring cycle, for example.

A method for measuring the numerically controlled machine tool according to the invention comprises the following steps: receiving a measuring apparatus on the work spindle of the machine tool, mounting a device according to one of claims 1 to 22 on a linearly and/or rotationally displaceable machine part of the machine tool, sensing an ambient temperature of the machine tool, determining a respective actual position of the first measuring element with the measuring apparatus in at least two positions of the machine part on the machine tool with respect to the sensed ambient temperature of the machine tool at the time of the respectively determined actual position of the first measuring element, determining a respective actual position of the second measuring element with the measuring apparatus in at least two positions of the machine part on the machine tool with respect to the sensed ambient temperature of the machine tool at the time of the respectively determined actual position of the second measuring element, adjusting the respectively determined actual positions of the first and second measuring elements with respect to the respectively sensed ambient temperature to a reference temperature of the machine tool, determining one or more coordinate reference parameters of one or more controllable axes of the machine tool based on the determined actual positions of the first and second measuring elements in the at least two positions of the machine part of the machine tool with respect to the reference temperature of the machine tool, the respective target positions of the first and second measuring elements in the at least two positions of the machine part of the machine tool with respect to the reference temperature of the machine tool, and a known distance between the first and second measuring elements with respect to the reference temperature of the machine tool.

When measuring absolute values, it is particularly crucial to carry out a temperature adjustment of the actual values, since the determined actual values are not comparable to the target values otherwise. In particular, when the temperature changes (for example, throughout the day in a machine shop) are very significant, a temperature adjustment may be vital for a reliable determination of the machine accuracy or machine errors.

By expanding the method with detecting the ambient temperature at the time of the respective determination of the actual positions, a correction of temperature influences (temperature changes during the measurement, etc.) of the determined actual positions is possible. This is done by adjusting the determined positions with their respective detected ambient temperatures to a reference temperature of the machine tool. Thus, when the temperature changes during the measurement, a comparison of the actual positions and target positions is only possible because the target positions/target values are usually valid for a certain temperature, in this case the reference temperature.

In the method described here, a point measuring system may again be used as the measuring apparatus, which may also comprise a laser spot meter or an air gap meter in addition to a measuring probe as a preferred measuring apparatus.

Furthermore, the correction of the temperature influences can also be performed the other way around by adjusting the target values (with respect to a certain temperature) to the respective ambient temperature.

Using the device according to the invention for measuring a machine tool is a simple way to offer the possibility to reliably measure all linear and rotary axes of the machine tool even finer in one measuring cycle and to calibrate the machine kinematics and additionally the basic geometry of the machine tool on the basis thereof, leading to a significant increase in machine accuracy.

Other aspects and advantages thereof, as well as advantages and more specific embodiments of the aspects and features described above, are described in the following descriptions and explanations with regard to the appended drawings, but are by no means intended to be restrictive,

DETAILED DESCRIPTION OF THE FIGURES AND PREFERRED EMBODIMENTS OF THE PRESENT INVENTION

Hereinafter, examples of embodiments of the present invention will be described in detail with reference to the accompanying drawings. Identical or similar elements in the figures may be designated by the same reference signs, but sometimes also by different reference signs.

It is to be noted, however, that the present invention is in no way limited to the embodiments described below and the features thereof, but rather includes modifications of the embodiments, particularly those which are included within the scope of the independent claims by modifications of the features of the described examples or by combination of one or more of the features of the described examples.

Figure 1:
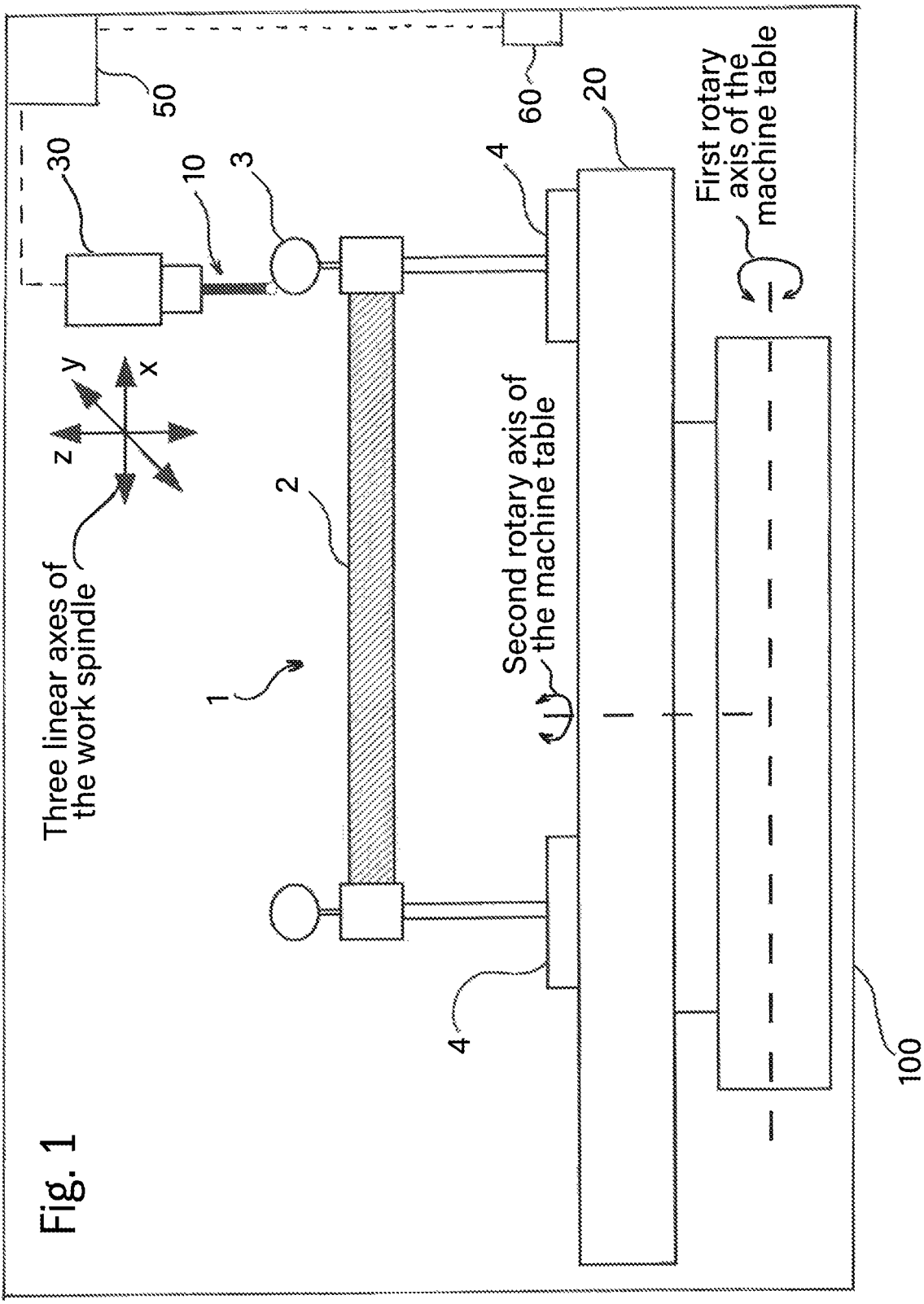
FIG. 1 schematically shows a machine tool with a machine part (here machine table) having a first embodiment of the device and the work spindle with measuring probe installed thereon.

FIG. 1 schematically shows a machine tool 100 with a machine part 20 (here machine table) having a first embodiment of the device 1 and a work spindle 30 with a measuring probe 10 installed thereon.

The device 1 (measuring device 1) includes two measuring elements 3, each attached to one end of a space element 2 and fixedly connected to the spacer element 2. Furthermore, the device in FIG. 1 includes two fastening elements 4, by means of which the device 1 can be fixed on the machine part 20.

The arrangement of measuring balls (or measuring ball portions) of the measuring elements 3 with the spacer element 2 does not necessarily have be restricted to one plane. In contrast to the example shown in FIG. 1, the measuring balls of the measuring elements 3 may also be rotated by an arbitrary angle about the longitudinal axis of the spacer element 2 relative to one another. In addition, the measuring balls of the measuring elements 3 may be arranged further inward, in the direction of the spacer element 2, or further outward, in the opposite direction with respect to the spacer element 2, from the ends of the spacer element 2 along the x-axis shown in FIG. 1 with connection to the respective ends of the spacer element 2. This applies analogously to the measuring balls of the measuring elements 3 with respect to the y-axis and z-axis.

The measuring elements 3 and the spacer element 2 form a unit by a rigid connection, which is intended for later use in the measurement of the machine tool 100 for reference purposes as a kind of "length standard". Furthermore, however, the rigid connection may be replaced by a detachable connection, if, for example, the measuring elements 3 and the ends of the spacer element 2 have mechanical stops which define a position of the measuring elements 3 relative to the spacer element 2. This can be used to advantage, e.g., when the measuring elements 3 must be replaced for differently shaped measuring elements 3 or differently shaped measuring balls/measuring ball portions, whereby, however, a renewed measuring of the distance of the measuring elements may not be absolutely necessary.

In addition, the material of the spacer element 2 is selected such that it has a very low expansion coefficient with respect to temperature changes. Suitable materials would be, inter alia, carbon fiber or quartz glass, wherein the coefficient of thermal expansion for a carbon fiber is about $-0.1 \times 10^{-6}$ K$^{-1}$ and for quartz glass is about $0.54 \times 10^{-6}$ K$^{-1}$. Other materials with a low coefficient of thermal expansion may also be suitable for use as a spacer element.

At the ends of the spacer element 2 (and as shown in FIG. 1 also on the measuring elements 3), the fastening element 4 is respectively provided in order to fasten the device 1 on the machine part 20 (here machine table). For this purpose, the fastening element 4 may comprise an electromagnet or a mechanically switchable permanent magnet, by means of which each fastening element 4 may be fastened to a surface of the machine part 20. In addition, it is possible to use a detachable adhesive bond between the device 1 and the machine part 20 instead of a magnetic fastening option. Furthermore, instead of or in combination with the magnetic fastening, a clamp fastening may be provided in order to fix the device 1 to the machine part 20.

The measuring probe 10 received in the work spindle 30 of the machine tool 100 may preferably detect the measuring elements 3 of the device 1 (measuring device 1) tactilely, i.e., by contact. Furthermore, however, optical detection (for example by means of a laser spot meter) of the measuring elements 3 may also be performed in order to determine the respective position thereof relative to a machine coordinate system of the machine tool 100. Further, the measuring probe 10 may be sense the contact with the sensing elements 3, e.g., capacitively or inductively, but also by variable electrical resistances, such as are used in strain gauges.

The work spindle 30 of the machine tool 100 may now be used to move the measuring probe 10 via the linear axes shown in FIG. 1 in the x, y and z directions and thus to tactilely sense the measuring ball/measuring ball portion of the measuring elements 3. Thanks to the known radius of the measuring ball/measuring ball portion of the measuring element 3, the center point of the measuring ball/measuring ball portion of the measuring element 3 may now be used as a measuring point. However, it is also possible to use the contact point between measuring probe 10 and the measuring element 3 itself as a measuring point, since it is true that each measuring ball/measuring ball portion itself has deviations in shape from the ideal sphere, but these are often negligibly small.

Nevertheless, with several contact points as measuring points per measuring element 3, an even finer image of the position of the measuring elements 3 and thus of the machine kinematics and basic geometry of the machine tool 100 may be created. This, in turn, may prove to be extremely helpful for the possible subsequent calibration of the machine tool 100 and for increasing the machine accuracy.

Furthermore, as shown in FIG. 1, the machine table may be moved as a machine part 20 of the machine tool 100 about a first and a second rotary axis. This makes it possible to generate a height offset of the measuring elements 3 of the device 1, without having to rely on a flexible positioning of the device 1 on the machine table or on an extra element (for example, a height element 40, see FIGS. 2 to 3B) for adjusting the height offset. Based thereon, all axes of the machine tool 100 may now be measured in one measuring cycle.

It may be advantageous deliberately not to position the device 1 (measuring device 1) symmetrically with respect to the machine table on the machine table. Rather, it may be attempted to achieve as different positions of the measuring elements 3 as possible relative to the machine table via the selected distance of the measuring elements 3, while always keeping the distance of the measuring elements 3 as constant as possible. This may be used, for example, for improved retraceability of measured machine errors of the machine tool 100 to their respective causes.

In general, the machine tool 100 has an evaluation unit 50, which is not further specified here, which receives and, if necessary, processes the determined positions of the measuring elements 3. In addition, the evaluation unit 50 is generally connected to a temperature measuring means 60, which is configured to sense ambient temperatures within and/or outside the machine tool 100 and to send the sensed values to the evaluation unit 50 for possible consideration at the determined position values.

It should be noted, that the division of the linear and rotary axes as shown in FIG. 1 is not restricted to the work spindle 30 being movable along all three linear axes (L1, L2, L3) and the machine table only being twistable about the two rotary axes (R1, R2). A division of the controllable axes may, e.g., also be such that the work spindle 30 has two linear axes and a rotary axis (perpendicular to the working axis of the work spindle 30) and the machine table has a linear and a rotary axis. Various further design possibilities of this division or a possible increase in the number of controllable traversing and moving axes of the machine tool 100 should hereby be taken into account.

Figure 2:
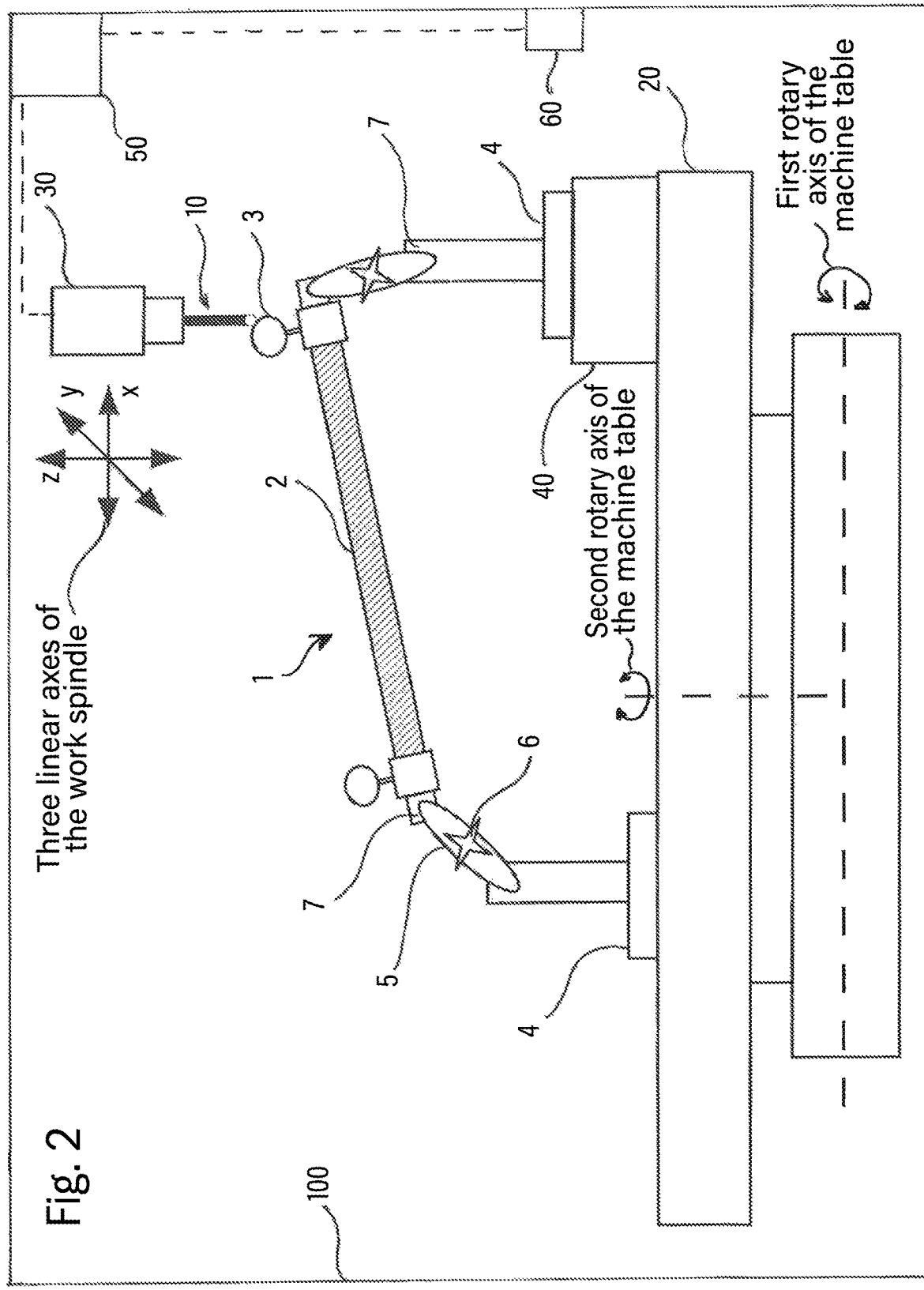
FIG. 2 schematically shows the machine tool with the machine part (here machine table) having a second embodiment of the device and the work spindle with measuring probe installed thereon.

FIG. 2 schematically shows the machine tool 100 with the machine part 20 (here machine table) having a second embodiment of the device 1 and the work spindle 30 with the measuring probe 10 installed thereon.

Compared to the device 1 in FIG. 1, the device 1 in FIG. 2 also includes two intermediate elements 5, each intermediate element 5 being connected to the fastening element 4 via one of the two joints 7 and to the measuring element 3 via the other of the two joints 7. The joints 7 may have a rotational degree of freedom, as is the case with a simple hinge, or else have a plurality of rotational degrees of freedom, such as in a ball joint or a universal joint.

Each of the intermediate elements 5 additionally has a locking means 6 which may be used, after the fastening of the fastening elements 4 on the machine part 20 and the alignment of the measuring elements 3 together with the spacer element 2, to fix the position of the measuring elements 3 and the spacer element 2 relative to the fastening element 4 or the machine part 20. Here, the joints 7 of the intermediate elements 5 which are used may be clamped, for example, or a movement of the joints 7 may be prevented otherwise. For clamping the joints 7, for example, a fastening of the joint-bearing portions of the intermediate elements 5 by means of a screw gear may be suitable as a locking means 6. But other possibilities may also be considered, such as a quick release device, as it is used in bicycles, for example.

Furthermore, by using the device 1 according to the exemplary embodiment in FIG. 2, a height offset (in this case in the z direction) may be deliberately generated, for example by an elevation element 40. Due to the height offset, all 5 axes of the machine tool 100 may be measured with one measurement cycle, for example, and a repositioning or displacement of the device 1 in order to detect all axes of the machine tool 100 may thereby be avoided.

However, the elevation element 40 may also be a workpiece to be machined, which is measured together with the machine tool 100. This is particularly advantageous when workpieces with a high weight must be manufactured/machined with high precision. For this purpose, it is advantageous, to measure the movement sequence of the machine table, on which the workpiece is clamped, for example, with the workpiece in advance of the actual machining process and to acquire the errors thus determined (for example, in the guides of the machine table) and to take them into account during machining. This can be achieved, for example, by compensation, i.e., the correction of the target position values, of the machine table in order to increase the accuracy of the machining of the workpiece significantly.

For the description of the evaluation unit 50, the temperature measuring means 60, and the linear and rotary axes ($L_1$, $L_2$, $L_3$, $R_1$, $R_2$), reference is made to FIG. 1 for reasons of avoiding unnecessary repetition.

Figure 3A:
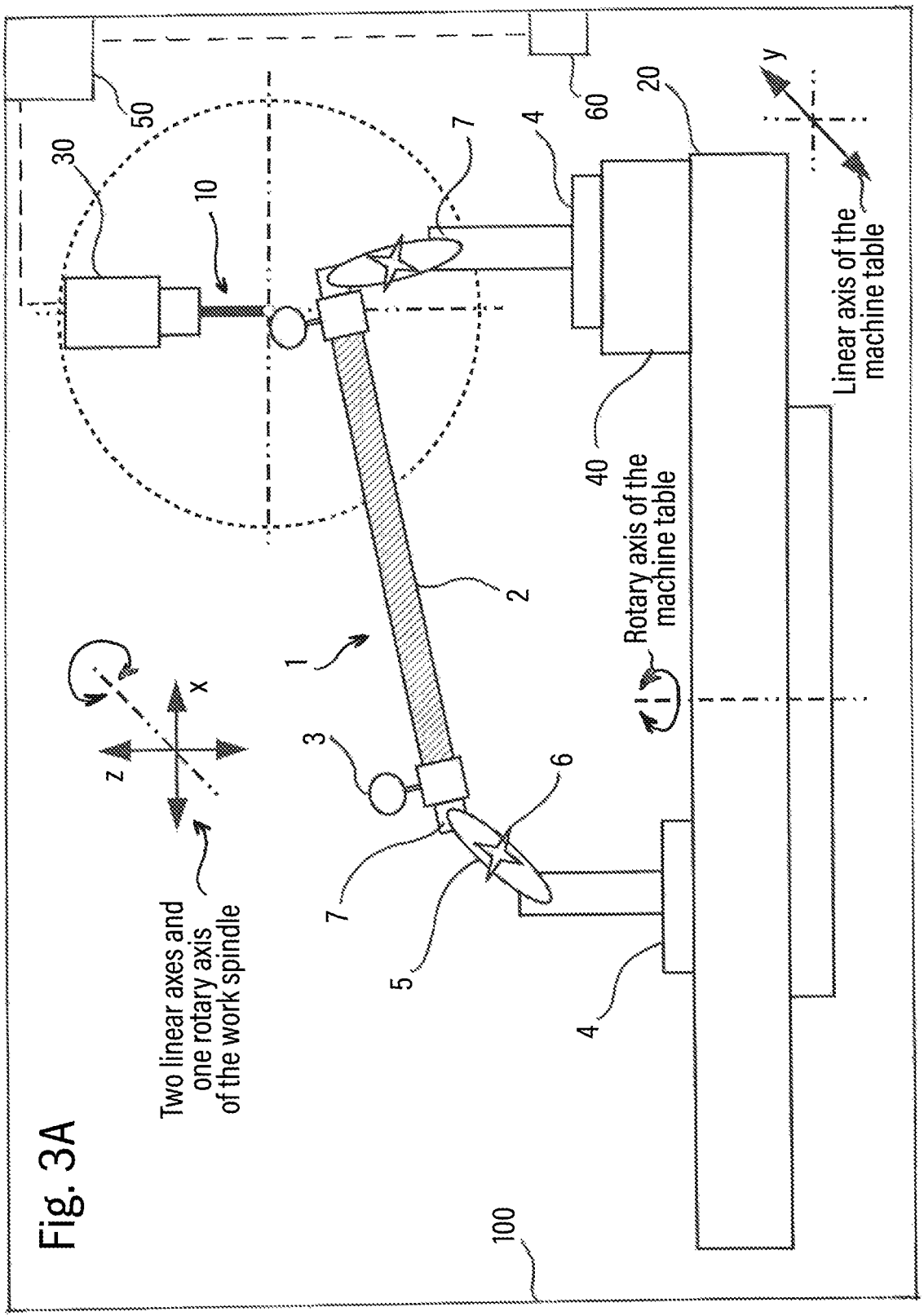
FIG. 3A schematically shows a machine tool with a machine part (here machine table) having the second embodiment of the device and the work spindle with measuring probe installed thereon.

FIG. 3A schematically shows a machine tool 100 with a machine part 20 (here machine table) having the second embodiment of the device 1 and the work spindle 30 with measuring probe 10 installed thereon.

The difference from the design as shown in FIG. 2 is that the machine tool 100 now has a different configuration than the machine tool 100 in FIGS. 1 and 2.

The work spindle 30 of the machine tool 100 shown here now has two linear axes (here in the x and z directions) and a rotary axis (together $L_1$, $L_2$, $R_3$) which makes the work spindle 30 rotatable about the y-axis. Furthermore, the machine table (as machine part 20) now has a linear axis (y direction, $L_3$) and a rotary axis ($R_2$) with which the machine table may be rotated around the z-axis. Furthermore, the tip of a tool, in this case the tip of the measuring probe 10, is located, as is usual in machine tools 100 configured such, in the axis of rotation of the rotary axis of the work spindle 30, which is to be illustrated in FIG. 3A by the center of the circle around the work spindle 30.

What is special about this configuration of the machine tool 100 is that, when positioning the measuring elements 3 of the device 1 without height offset (as shown in FIG. 1), the linear axis in z direction could not be measured in the same cycle as the other axes. By configuring the device 1 with the intermediate elements 5, as shown in FIGS. 2 and 3A, the measuring structure is so flexible, however, that a height offset for the measurement of the linear axis in the z direction can be provided. This can be additionally amplified by the use of the elevation element 40 (or of the workpiece) in order to increase the range of movement which the linear axis has to move in the z direction.

For reasons of avoiding unnecessary repetition, reference is hereby made to FIG. 1 for the description of the evaluation unit 50 and the temperature measuring means 60.

Figure 3B:
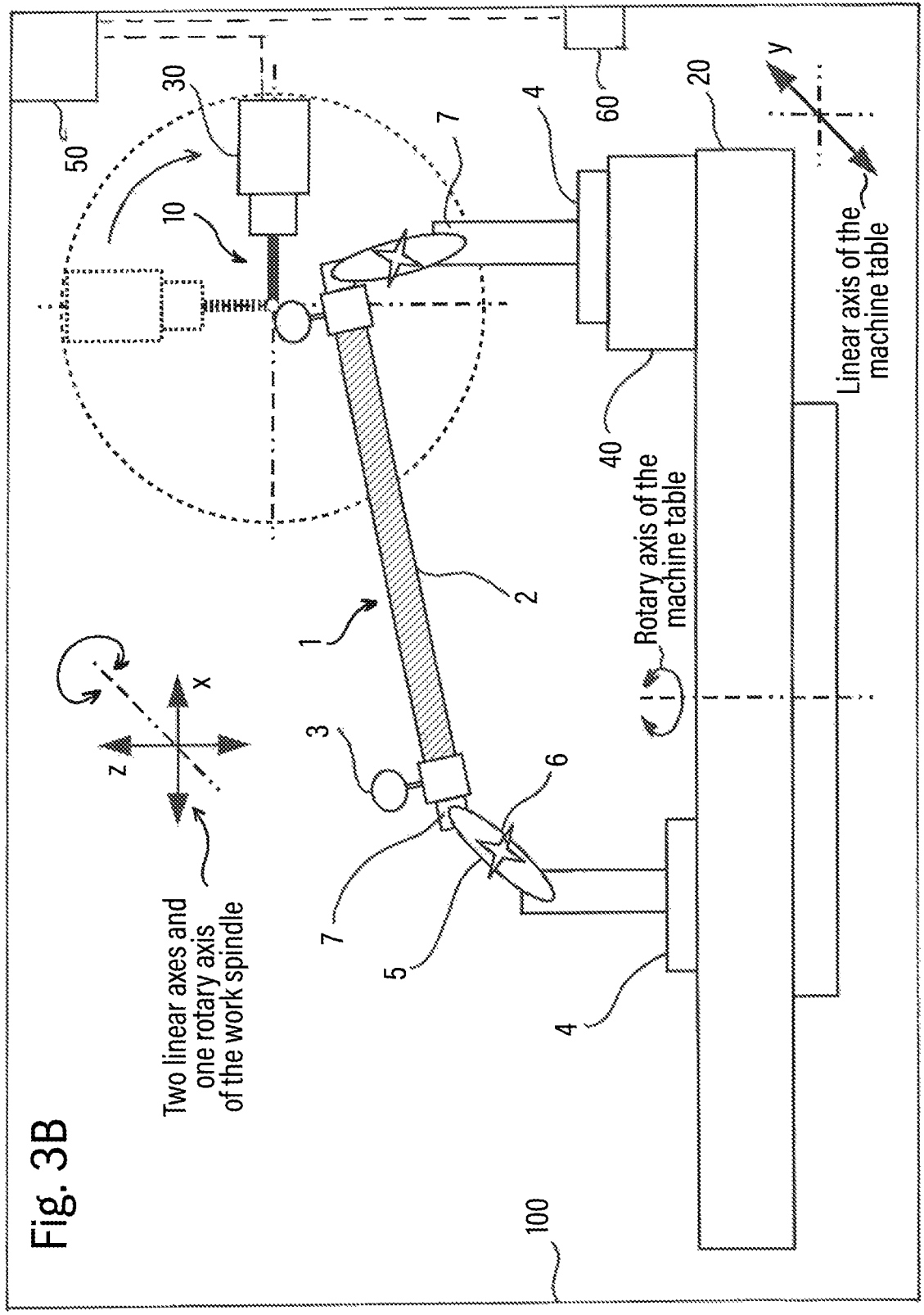
FIG. 3B schematically shows the machine tool according to FIG. 3A with machine part (here machine table) having a second embodiment of the device and a displaced working spindle with measuring probe installed thereon.

FIG. 3B schematically shows the machine tool 100 according to FIG. 3A with the machine part 20 (here machine table) having the second embodiment of the device 1 and a displaced work spindle 30 with measuring probe 10 installed thereon.

FIG. 3B shows the displacement of the work spindle 30 of the machine tool 100 from a vertical position to a horizontal position and how the tip of the probe 10 remains in its position. This again makes clear the need for a height offset in order to avoid a renewed positioning of the device 1 in a changed position relative to the machine table.

For the description of the evaluation unit 50, the temperature measuring means 60, and the linear and rotary axes ($L_1$, $L_2$, $R_3$, $L_3$, $R_2$), reference is made to FIG. 1 for reasons of avoiding unnecessary repetition.

Figure 4:
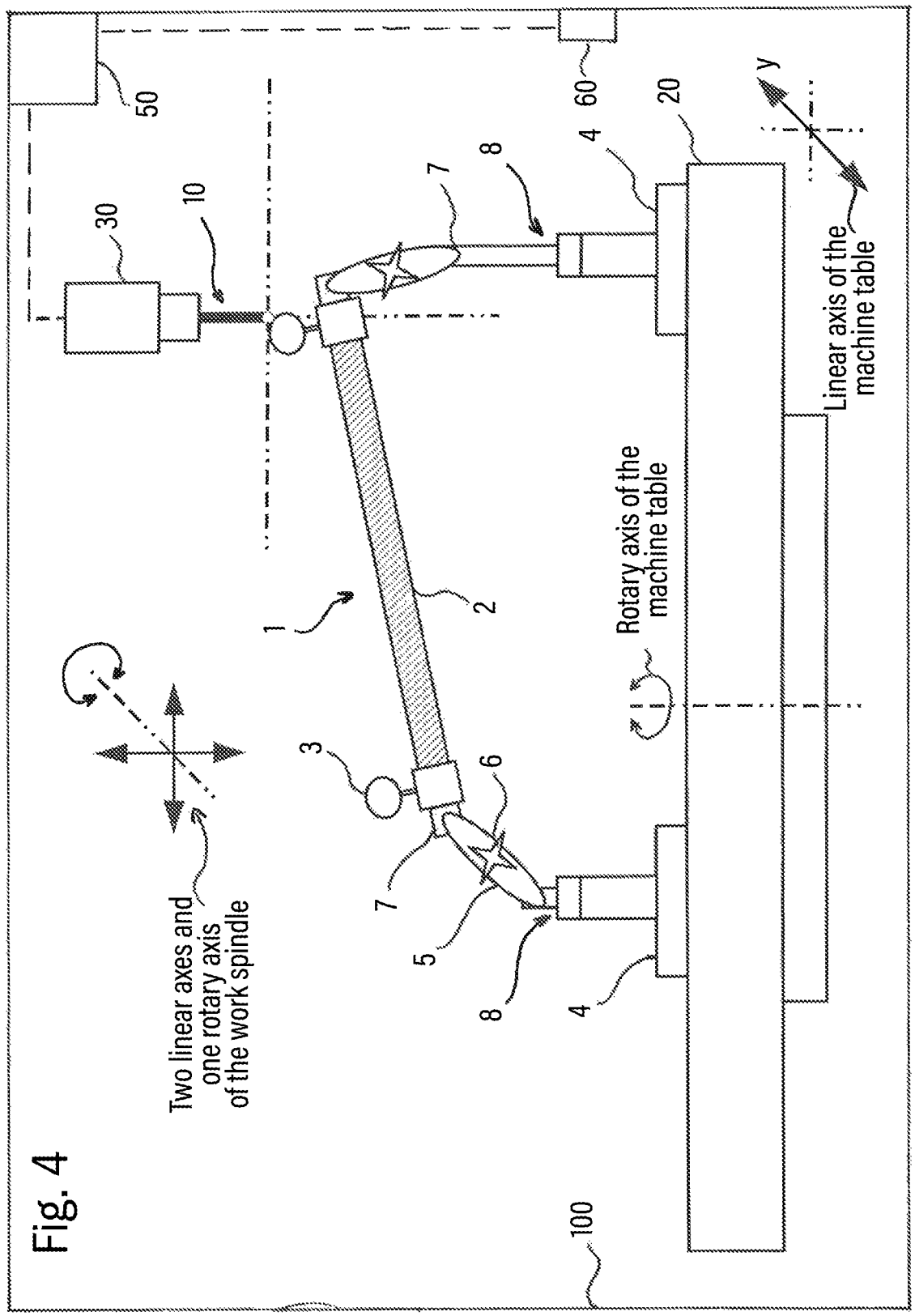
FIG. 4 schematically shows the machine tool with machine part (here machine table) with a third embodiment of the device and the work spindle with measuring probe installed thereon.

FIG. 4 schematically shows the machine tool 100 with the machine part 20 (here machine table) having a third embodiment of the device 1 and the work spindle 30 with measuring probe 10 installed thereon.

The embodiment of the device 1 shown here differs from the device 1 shown in FIGS. 3A and 3B by the provision of a telescopic adjusting means 8 by means of which the distance between the respective measuring element 3 and the machine part 20 may be adjusted in steps or continuously within a certain range.

In the telescopic adjusting means 8, the distance to the machine part 20 may be held in a clamping manner (e.g., by means of a union nut or a quick release device), or the fastening element 4 is provided with a thread and may be screwed into or out of the measuring element 3, so that a distance between the fastening element 4 and the measuring element 3 may be increased or decreased. Also, a stepwise adjustment of the distance is possible, for example, by means of a latching mechanism.

For the description of the evaluation unit 50, the temperature measuring means 60, and the linear and rotary axes ($L_1$, $L_2$, $R_3$, $L_3$, $R_2$), reference is made to FIG. 1 for reasons of avoiding unnecessary repetition.

Figure 5A:
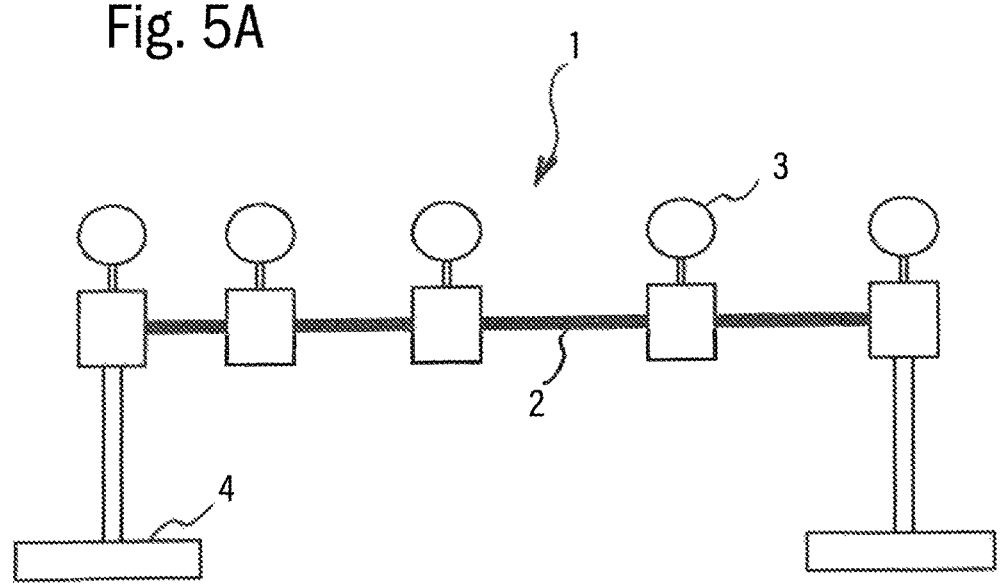
FIG. 5A shows a fourth embodiment of the device with a plurality of measuring elements along the spacer element.

FIG. 5A shows a fourth embodiment of the device 1 with a plurality of measuring elements 3 along the spacer element 2 in a schematic representation.

The device 1 shown here now not only has one measuring element 3 each at the two ends of the spacer element 2, but also has further measuring elements 3 mounted along the spacer element 2. In this case, the number of additional measuring elements 3 is in no way limited to the number shown, just as the division of the additional measuring elements 3 on the length of the spacer element 2 is in no way limited to the one shown. The distances between the measuring elements 3 may be previously determined or may be measured before the measurement of the machine tool 100.

Advantageously, a significantly higher number of measuring points per measuring cycle may thereby be acquired, which may considerably improve the measurement and the subsequent correction of the machine geometry. In addition, the distribution of the measuring elements 3 over the length of the spacer element 2 may be very flexible in order to provide regions that require a more detailed detection of their change of position with more measuring elements 3. On the machine part 20 as a machine table, these may be, for example, regions with a greater distance to the pivot point of the machine table.

The device 1 may also be expanded by the telescopic adjusting means 8 described in FIG. 4 and/or expanded by the intermediate elements 5, the locking means 6, and/or the joints 7 described in FIG. 2, even if they are not explicitly shown in FIG. 5A.

Figure 5B:
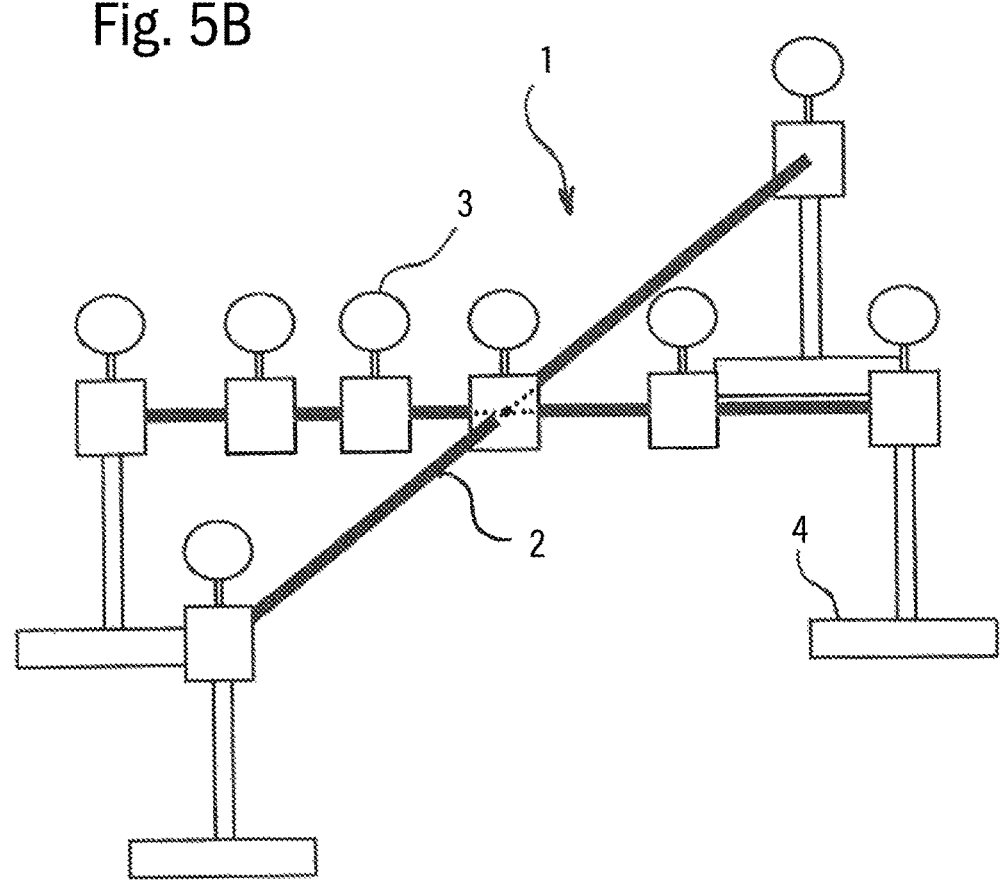
FIG. 5B shows a fifth embodiment of the device with a cross-shaped spacer element, a plurality of measuring elements (also along portions of the cross-shaped spacer element), and a four-point attachment of the device.

FIG. 5B shows a fifth embodiment of the device 1 with a cross-shaped spacer element 2, a plurality of measuring elements 3 (also along portions of the cross-shaped spacer element 2), and a four-point attachment of the device 1 in a schematic representation.

It can also be advantageous not to configure the spacer element 2 as a purely rod-shaped element, but to make it a cross-shaped element. This results in further possibilities of equipping the spacer element 2 with measuring elements 3, which in turn may be adapted to specific needs of the measurement of the machine tool 100. This also makes it possible to acquire a significantly higher number of measuring points per measuring cycle, which in turn may considerably improve the measurement and subsequent correction of the machine geometry.

In addition, superimposed inaccuracies can be detected via the two spatial directions along which the cross-shaped spacer element 2 extends, for example. One example is the case of a rotary axis of the machine part 20. Here, not only axis errors/axial misalignments in radial direction can be detected when the rotary axis rotates, but also tilting of the rotary axis can also be detected in parallel. This saves time and shows inaccuracies in a very short time, which otherwise would possibly only have been detected by more frequent measuring and moving of the device 1.

Again, the number of measuring elements 3 is in no way limited to the number shown, just as the distribution of the additional measuring elements 3 over the length of the rod-shaped regions of the cross-shaped spacer element 2 is in no way limited to the one shown.

In addition, a measuring element 3 does not necessarily have to be provided in the crossing point of the rod-shaped portions of the cross-shaped spacer element 2. The rod-shaped portions may also be connected to each other by a connecting element, or the cross-shaped spacer element 2 may be integrally formed.

The device 1 may also be expanded by the telescopic adjusting means 8 described in FIG. 4 and/or be expanded by the intermediate elements 5, the locking means 6 and/or the joints 7 described in FIG. 2, even if these are not explicitly shown in FIG. 5B.

Figure 6:
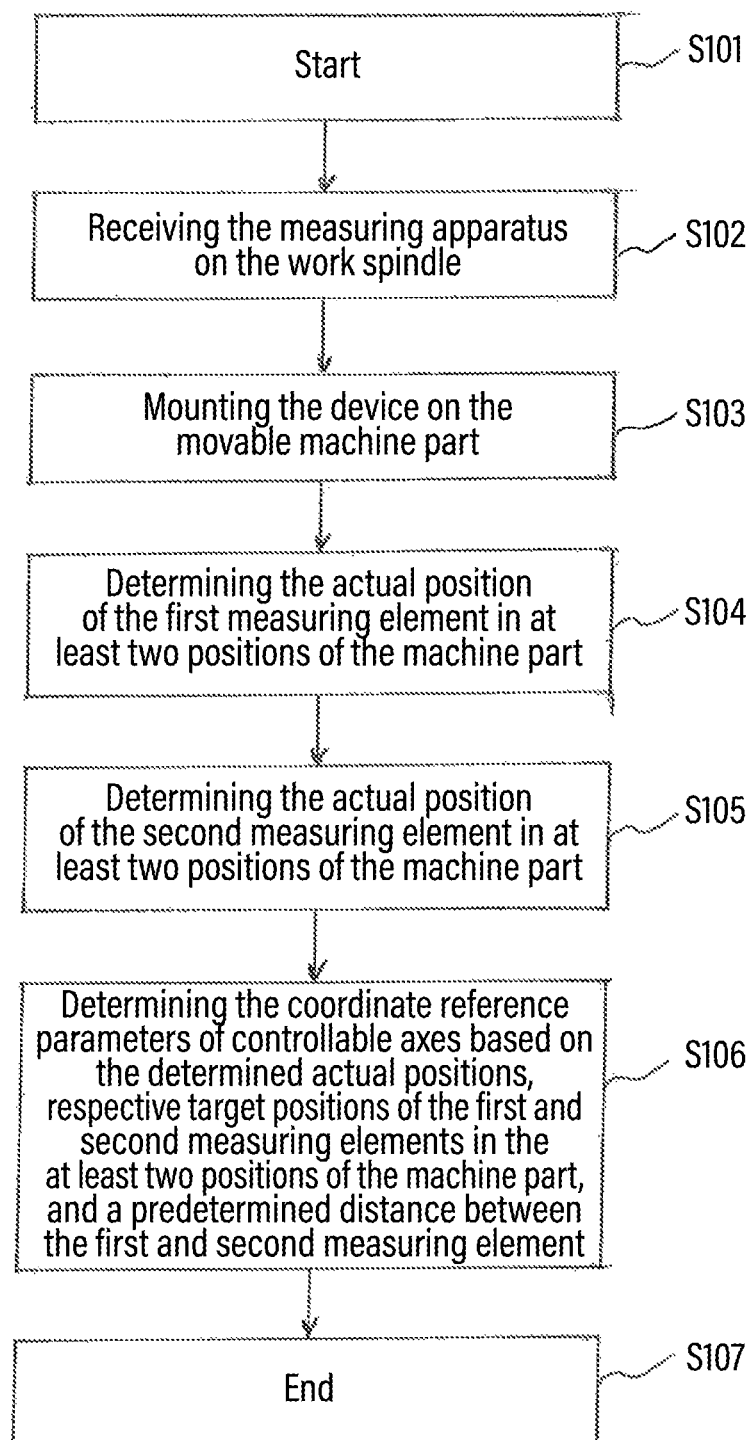
FIG. 6 shows a flow chart of an embodiment of the method according to the invention.

FIG. 6 shows a flow chart of an exemplary embodiment of the method according to the invention.

In the method according to the invention, in step S102, at the beginning of the method, the measuring probe 10 is received in the work spindle 30 of the machine tool 100 and put into operation. Here, subsequent sub-steps may be carried out in order to connect the measuring probe 10 with an evaluation unit 50 not further specified here and to configure it for the machine coordinate system present in the machine tool 100.

In the next step S103, the device 1 is fastened on the machine part 20, which may correspondingly be movable along various longitudinal axes and/or various rotary axes, by means of the fastening elements 4. In addition, as shown in FIG. 2, an elevation element 40 may be used to deliberately generate a height offset of the measuring elements 3 of the device. Moreover, instead of or in combination with the elevation element 40, a workpiece to be machined which is already clamped on the machine table (as the machine part 20) of the machine tool 100 may be used, to which the device 1 may be fastened.

In the subsequent step S104, the position coordinates (actual position) of a first of the measuring elements 3 of the device 1 at a first position of the machine part 20 are determined by means of the measuring probe 10. After the position of the machine part 20 has been changed by moving the at least one controllable axis (of, e.g., three linear axes and two rotary axes) of the machine tool 100 to a second position, the position coordinates (actual position) of the first measuring element 3 are determined by the measuring probe 10 again. The number of positions adopted by the machine part 20 is not limited to 2 positions, but may be arbitrarily increased, just as the number of contacts (points of contact) of the measuring probe 10 with the first or any other measuring element 3 per position of the machine part 20.

In step S105, analogous to step S104, the determination of the position coordinates (actual position) of a second measuring element 3 of the device 1 is performed in at least two positions of the machine part 20.

However, the movement may also be modified in such a way that the position coordinates (actual position) of the first measuring element 3 are determined by the measuring probe 10 at the first position of the machine part 20 and subsequently the position coordinates (actual position) of the second measuring element 3 are determined by the measuring probe 10 without changing the position of the machine part 20 before the machine part 20 is moved to the second position.

In the next step S106, one or more reference parameters (coordinate reference parameters) for the machine coordinate system of the machine tool 100 are determined from at least one of the controllable axes of the machine tool 100. This is done by evaluating the determined position coordinates (actual positions) of the first and second measuring elements 3 in the at least two positions of the machine part 20, the respective target positions of the first and second measuring elements 3 in the at least two positions of the machine part 20, and a previously known distance between the first and the second measuring element 3.

By means of the reference parameters, the corresponding controllable axis of the machine tool 100 may now be calibrated by compensation, for example. Furthermore, the evaluation may also provide information about whether a compensation of the errors in the corresponding axis of the machine tool 100 makes sense or is even possible. If a compensation of the errors of the controllable axis is no longer possible, then the reference parameters or the resulting deviations from the ideal axis may be used to adjust or otherwise calibrate the corresponding controllable axis.

Advantageously, a classification of the machine tool 100 may be performed along with the evaluation. In this way, it may be quickly decided over the course of a machining sequence of a workpiece depending on the accuracy required for the workpiece or on the tolerances required for the workpiece, on which machine tool 100 the corresponding machining steps can be performed.

Figure 7:
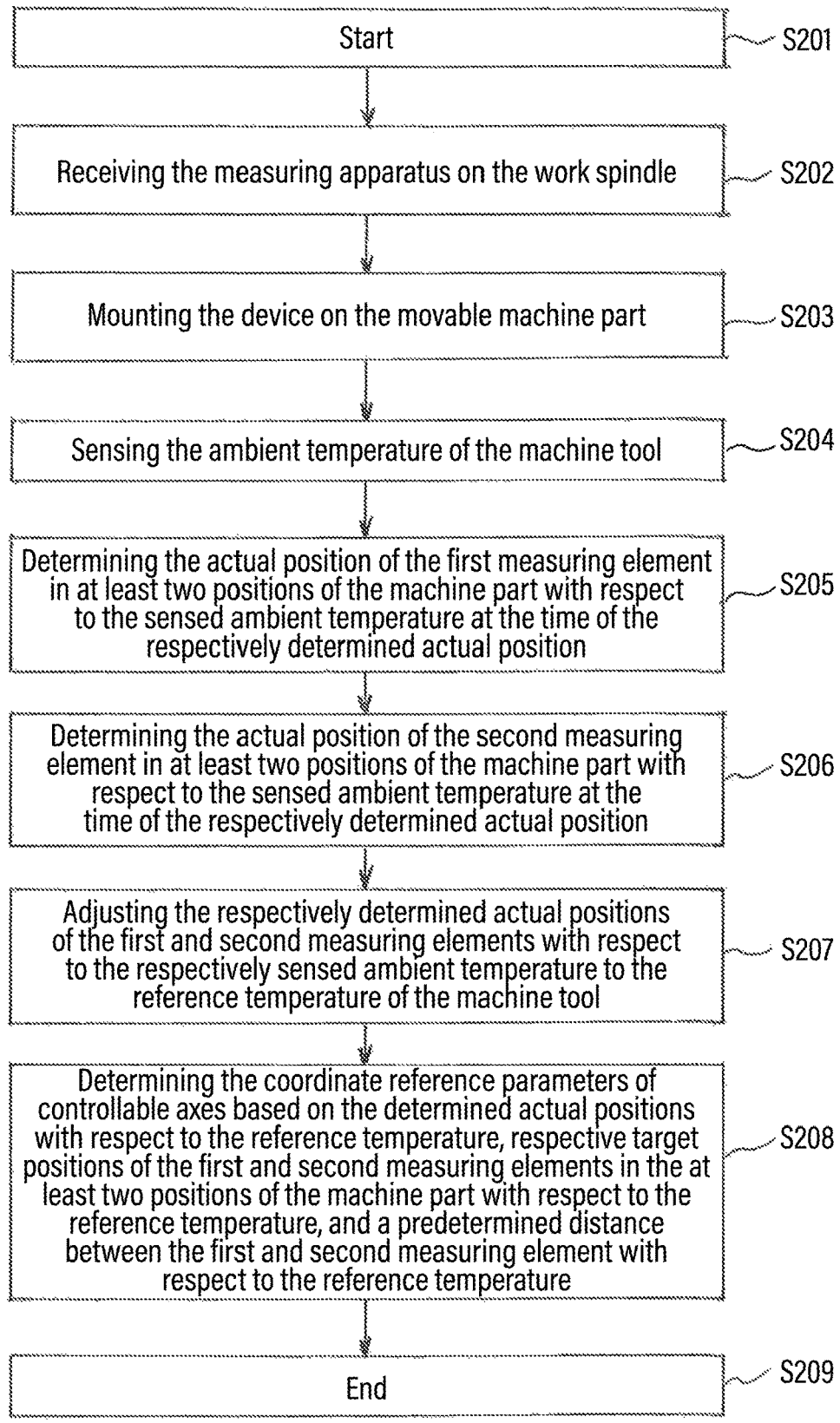
FIG. 7 shows a flow chart of an embodiment of another method according to the invention.

FIG. 7 shows a flow chart of an embodiment of the further method according to the invention.

The steps S201 to S203 of the further method according to the invention are identical to the steps S101 to S103 of the previous method according to the invention.

In step S204, the ambient temperature is sensed. This can be performed, for example, by one or more temperature measuring means 60 inside and/or outside the machine tool 100. The sensed temperature values are sent to an evaluation unit 50 not further specified here and processed therein.

In the subsequent step S205, the position coordinates (actual position) of a first of the measuring elements 3 of the device 1 are determined in a first position of the machine part 20 by means of the measuring probe 10. After the position of the machine part 20 has been changed by moving at least one controllable axis (of, e.g., three linear axes and two rotary axes) of the machine tool 100 to a second position, the position coordinates (actual position) of the first measuring element 3 are determined again by the probe 10. The determination of the actual positions of the first measuring element 3 is performed with respect to the ambient temperatures measured at this time.

The number of positions adopted by the machine part 20 is not limited to 2 positions, but can be arbitrarily increased, just as the number of contacts (points of contact) of the measuring probe 10 with the first or any other measuring element 3 per position of the machine part 20.

In step S206, analogous to step S205, the determination of the position coordinates (actual position) of a second measuring element 3 of the device 1 in at least two positions of the machine part 20 with respect to the ambient temperatures measured at this time is performed.

In step S207, the determined actual positions (actual values) with respect to the temperature values sensed at the time are adjusted to a reference temperature of the machine tool 100. This ensures that all values, including those of the target positions/target values, are valid for the same temperature. Only in this manner is it possible to compare the actual positions with the corresponding target positions and to determine the deviations/errors as accurately as possible.

In step S208, one or more reference parameters (coordinate reference parameters) for the machine coordinate system of the machine tool 100 are now determined from at least one of the controllable axes of the machine tool 100. This is achieved by evaluating the determined position coordinates (actual positions) of the first and second measuring elements 3 in the at least two positions of the machine part 20 with respect to the reference temperature of the machine tool 100, the respective target positions of the first and second measuring elements 3 in the at least two positions of the machine part 20 with respect to the reference temperature of the machine tool 100, and a previously known distance between the first and the second measuring element 3 with respect to the reference temperature of the machine tool 100.

By means of the reference parameters, the corresponding controllable axis of the machine tool 100 may now be calibrated by compensation, for example. Furthermore, the evaluation may also provide information about whether a compensation of the errors in the corresponding axis of the machine tool 100 makes sense or is even possible. If a compensation of the errors of the controllable axis is no longer possible, then the reference parameters or the resulting deviations from the ideal axis may be used to adjust or otherwise calibrate the corresponding controllable axis.

In the above, examples and embodiments of the present invention and their advantages have been described in detail with reference to the accompanying drawings.

It should be noted again, however, that the present invention is by no means limited to the embodiments described above and their features, but further includes modifications of the embodiments, particularly those which are included within the scope of the independent claims by modifications of the features of the described examples or by combination of one or more of the features of the described examples.

List of Reference Signs

1 Device/measuring device
2 Spacer element
3 Measuring element
4 Fastening element/fastening portion
5 Intermediate element
6 Locking means
7 Joint
8 Telescopic adjusting means
10 Measuring probe
20 Machine part
30 Work spindle
40 Elevation element
50 Evaluation unit
60 Temperature measuring means
100 Machine tool

The invention claimed is:

1. A device for use on a numerically controlled machine tool for application in a method for measuring said numerically controlled machine tool, said device comprising:
    a first measuring element for measuring via a measuring apparatus,
    a second measuring element for measurement via said measuring apparatus,
    a spacer element on which said first measuring element and said second measuring element are arranged spaced apart from each other, the first and second measuring elements each being fastened to said spacer element via a rigid connection, such that the first and second measuring elements are non-adjustable and fixed with respect to the spacer element, and
    at least one fastening portion for fastening said device to a machine part of said machine tool.

2. The device according to claim 1, wherein
    said spacer element has a portion arranged between said first and second measuring element, which is formed from a material which has a coefficient of thermal expansion of less than or equal to $3.0 \times 10^{-6}$ $K^{-1}$; or
    said spacer element has a portion arranged between said first and second measuring element, which is formed from a material which has a coefficient of thermal expansion of less than or equal to $3.0 \times 10^{-6}$ $K^{-1}$ in the spacing direction between said first and second measuring elements.

3. The device according to claim 1, wherein
    said spacer element includes a material which, at least between said first and second measuring elements, has a thermal expansion coefficient of less than or equal to $3.0 \times 10^{-6}$ $K^{-1}$; or said spacer element includes a material which, at least between said first and second measuring elements in the spacing direction between said first and second measuring elements, has a coefficient of thermal expansion of less than or equal to $3.0 \times 10^{-6}$ $K^{-1}$.

4. The device according to claim 1, wherein
said spacer element has a portion arranged between said first and second measuring elements which is formed of a carbon fiber reinforced plastic, or said spacer element is formed of a carbon fiber reinforced plastic.

5. The device according to claim 1, wherein
said spacer element has a portion arranged between said first and second measuring elements which is formed of quartz glass, or
said spacer element is formed of quartz glass.

6. The device according to claim 1, wherein
the first and/or the second measuring element is a measuring ball or has at least one measuring ball portion.

7. The device according to claim 1, wherein
a first fastening element having a first fastening portion for fastening said device to said machine part of said machine tool and a second fastening element having a second fastening portion for fastening to said machine part of said machine tool,
wherein said first fastening element and said second fastening element are arranged on said spacer element spaced apart from each other.

8. A system comprising a numerically controlled machine tool and a device for use on the numerically controlled machine tool according to claim 1.

9. The device according to claim 4, wherein
said spacer element is configured as a carbon fiber rod.

10. The device according to claim 5, wherein
said spacer element is configured as a quartz glass rod.

11. The device according to claim 7, wherein
said first and second fastening elements are each fastened to said spacer element and/or a respective one of said measuring elements via a rigid connection.

12. The device according to claim 7, wherein
said first and second fastening elements are each fastened to said spacer element and/or to a respective one of said measuring elements via a lockable connection.

13. The device according to claim 7, wherein
said first fastening element is connected with said spacer element and/or a respective one of said measuring elements via a first intermediate element, wherein a first joint is arranged between said first fastening element and said first intermediate element and a second joint is arranged between said first intermediate element and said spacer element and/or the respective one of said measuring elements, and/or
said second fastening element is connected with said spacer element and/or a respective one of said measuring elements via a second intermediate element, wherein a third joint is arranged between said second fastening element and said second intermediate element and a fourth joint is arranged between said second intermediate element and said spacer element and/or the respective one of said measuring elements.

14. The device according to claim 7, wherein
the first and/or second fastening element comprises a magnetic holder for fastening to said machine part of said machine tool.

15. The device according to claim 1, wherein
said spacer element defines a predetermined distance between said first and second measuring elements.

16. The device according to claim 12, wherein
the first and/or second fastening element is pivotable and/or freely rotatable relative to said spacer element in an unlocked state of said lockable connection.

17. The device according to claim 12, wherein said lockable connection of the first and/or second fastening element has one or more joints.

18. The device according to claim 13, wherein
said first intermediate element has a locking means for simultaneously locking said first and second joints, and/or
said second intermediate element has a locking device for simultaneously locking said third and fourth joints.

19. The device according to claim 14, wherein
said magnetic holder includes a switchable electromagnet and/or a mechanically switchable magnetic base.

20. The device according to claim 15, wherein
said predetermined distance between said first and second measuring elements is greater than or equal to 100 mm.

21. The device according to claim 15, wherein
said predetermined distance between said first and second measuring elements is less than or equal to 800 mm.

22. The device according to claim 15, wherein
said device is provided for use on a predetermined machine tool, wherein said machine tool comprises a controllable linear axis and said spacer element has a predetermined distance between said first and second measuring elements, the distance being 30% to 70% of the axial length of said controllable linear axis.

23. A method for measuring a numerically controlled machine tool, said method comprising:
receiving a measuring apparatus on a work spindle of said machine tool,
mounting a device on a linearly and/or rotationally displaceable machine part of said machine tool, wherein said device comprises a first measuring element for measuring via a measuring apparatus, a second measuring element for measurement via said measuring apparatus, a spacer element on which said first measuring element and said second measuring element are arranged spaced apart from each other, and at least one fastening portion for fastening said device to said machine part of said machine tool,
determining a respective actual position of said first measuring element with said measuring apparatus in at least two positions of said machine part on said machine tool,
determining a respective actual position of said second measuring element with said measuring apparatus in at least two positions of said machine part on said machine tool,
determining one or more coordinate reference parameters of one or more controllable axes of said machine tool based on the determined actual positions of said first and second measuring elements in the at least two positions of said machine part of said machine tool, the respective target positions of said first and second measuring elements in the at least two positions of said machine part of said machine tool, and a known distance between said first and second measuring elements.

24. A method for measuring a numerically controlled machine tool, said method comprising:
receiving a measuring apparatus on a work spindle of said machine tool,
mounting a device on a linearly and/or rotationally displaceable machine part of said machine tool, wherein said device comprises a first measuring element for measuring via a measuring apparatus, a second measuring element for measurement via said measuring apparatus, a spacer element on which said first measuring element and said second measuring element are arranged spaced apart from each other, and at least one fastening portion for fastening said device to said machine part of said machine tool, sensing an ambient temperature of said machine tool, determining a respective actual position of said first measuring element with said measuring apparatus in at least two positions of said machine part on said machine tool with respect to the sensed ambient temperature of said machine tool at a time of the respectively determined actual position of said first measuring element, determining a respective actual position of said second measuring element with said measuring apparatus in at least two positions of said machine part on said machine tool with respect to the sensed ambient temperature of said machine tool at the time of the respectively determined actual position of said second measuring element, adjusting the respectively determined actual positions of said first and second measuring elements with respect to the respectively sensed ambient temperature to a reference temperature of said machine tool, determining one or more coordinate reference parameters of one or more controllable axes of said machine tool based on the determined actual positions of said first and second measuring elements in the at least two positions of said machine part of said machine tool with respect to said reference temperature of said machine tool, the respective target positions of said first and second measuring elements in the at least two positions of said machine part of said machine tool with respect to said reference temperature of said machine tool, and a known distance between said first and second measuring elements with respect to said reference temperature of said machine tool.

* * * * *